(12) United States Patent
Briceno

(10) Patent No.: US 7,254,719 B1
(45) Date of Patent: Aug. 7, 2007

(54) METHOD AND SYSTEM FOR PROTECTING SOFTWARE

(76) Inventor: Marc A. Briceno, 1032 Irving St. #706, San Francisco, CA (US) 94122

( * ) Notice: Subject to any disclaimer, the term of this patent is extended or adjusted under 35 U.S.C. 154(b) by 643 days.

(21) Appl. No.: 10/636,039

(22) Filed: Aug. 7, 2003

Related U.S. Application Data

(60) Provisional application No. 60/402,386, filed on Aug. 8, 2002.

(51) Int. Cl.
*G06F 1/24* (2006.01)

(52) U.S. Cl. ............... 713/194; 713/193; 713/189; 713/168; 713/161

(58) Field of Classification Search .......... 713/194, 713/193, 189, 168, 161
See application file for complete search history.

(56) References Cited

U.S. PATENT DOCUMENTS

| | | | | |
|---|---|---|---|---|
| 3,796,830 A | * | 3/1974 | Smith | 380/37 |
| 3,806,882 A | * | 4/1974 | Clarke | 711/164 |
| 3,906,448 A | * | 9/1975 | Henriques | 235/438 |
| 3,924,065 A | * | 12/1975 | Freeny, Jr. | 375/274 |
| 6,148,402 A | | 11/2000 | Campbell | |
| 6,157,721 A | | 12/2000 | Shear | |
| 6,292,569 B1 | | 9/2001 | Shear | |
| 6,304,970 B1 | | 10/2001 | Bizzaro | |
| 6,327,652 B1 | | 12/2001 | England | |
| 6,330,670 B1 | | 12/2001 | England | |
| 6,449,720 B1 | | 9/2002 | Sprague | |

OTHER PUBLICATIONS

Steven Levy, "The Big Secret," Newsweek, Jul. 1, 2002, p. 48, Newsweek, New York, NY.
Trusted Computing Platform Alliance, "Main Specification Version 1.1a," Nov. 2001, TCPA, USA.
Trusted Computing Group, "TCG PC Specific Implementation Specification Version 1.0," Sep. 2001, TCG, USA.

* cited by examiner

*Primary Examiner*—Thomas R. Peeso

(57) ABSTRACT

Secure environments can be used to protect software application programs from piracy and to enforce licensing and operating conditions. To achieve these protections, a component should be selected and executed inside the secure environment. For maximum protection, the selected component should be one which performs a required or desirable part of the functionality of the application and not be easily emulated by patches as may be employed by software pirates.

9 Claims, 3 Drawing Sheets

METHOD AND SYSTEM FOR PROTECTING SOFTWARE

CROSS-REFERENCE TO RELATED APPLICATIONS

This application claims the benefit of provisional application Ser. No. 60/402,386, filed on Aug. 8, 2002 by the present inventor.

FEDERALLY SPONSORED RESEARCH

Not Applicable.

SEQUENCE LISTING OR PROGRAM

Not Applicable.

BACKGROUND OF THE INVENTION

The present invention relates to software controls and, more particularly, to protecting applications from software piracy and enabling application vendors to enforce application operating restrictions.

PRIOR ART

Software piracy is a major threat to the software industry, costing United States software companies billions of dollars annually in lost revenue.

Historical Protections

Traditionally, software vendors have attempted to combat software piracy by utilizing two technical means, hardware protection measures (commonly known as "dongles"), and software protection measures. More recently, vendors have turned to secure computing environments for protection.

Both historical methods have failed to effectively protect against software piracy for a number of reasons, including the following:

Hardware protection measures are expensive to deploy and require legitimate software customers to install cumbersome hardware devices, such as Universal Serial Bus (USB) or parallel port tokens, smartcards, or biometric authentication devices. Additionally, software pirates frequently find ways to emulate hardware dongles in software, thus negating the dongles' protection measures.

Similarly, software protection measures have shown to be easily bypassed by software pirates. Despite implementation of some of the industry's most sophisticated software protection measures, software application patches that disable the anti-piracy measures in software products such as MICROSOFT OFFICE and the MICROSOFT XP operating system are readily available on the Internet from websites and via file sharing networks.

Recent Protection Developments

MICROSOFT Corporation recently announced the upcoming release of their Digital Rights Management (DRM) operating system (OS) component based on U.S. Pat. No. 6,330,670. MICROSOFT Corporation's product name for this DRM OS component was initially "Palladium," but the product is now called the "next-generation secure computing base" (NGSCB). MICROSOFT Corporation has announced that the NGSCB component will enable applications to enforce digital rights management on content, and on documents processed by an NGSCB and DRM-enabled application.

On the evening of Wednesday, Aug. 7, 2002, at the USENIX Security Conference held in San Francisco, Calif., I moderated a panel titled "Trusted Computing Platform Alliance (TCPA) and Palladium." In discussions during and after the panel, Peter Biddle, MICROSOFT Corporation's Product Unit Manager for NGSCB, informed me that MICROSOFT Corporation's NGSCB effort cannot be used, alone or in conjunction with any other technology, to discourage software piracy. According to Peter Biddle, the NGSCB team found itself repeatedly in the position of having to inform MICROSOFT Corporation's anti-piracy group that NGSCB cannot offer benefits that would assist in the anti-software piracy effort.

The Trusted Computing Platform Alliance (TCPA) is an alliance of entities including MICROSOFT Corporation, HEWLETT-PACKARD Corporation, IBM, and INTEL Corporation.

While NGSCB and an operating system built on TCPA specifications can be effective to protect copyrighted data processed by software applications from infringers, NGSCB and operating systems built on the TCPA specifications are not currently effective to protect the applications themselves from infringers.

Upon Peter Biddle's request, Brian LaMacchia, a senior security architect at MICROSOFT Corporation participating in the discussion, confirmed that the NGSCB technology in his expert opinion is unable to assist in anti-software piracy efforts.

There are two inventions which attempt to use secure environments to prevent software piracy. Both solutions have significant shortcomings as discussed below.

Application Executes Entirely Inside the Secure Environment

In this method, the entire software application program that is to be protected against software piracy or license agreement violations is executed inside a secure environment. While this method is feasible, secure environment performance is significantly reduced in comparison to what is offered by a corresponding insecure environment. Thus, reduced speed, memory, lack of application programming interfaces (APIs), and reduction of other functionality make execution of an application entirely inside the secure environment much less desirable from performance and functionality standpoints, than executing the application outside the secure environment.

Application Maintains Only Secret Information Inside the Secure Environment

In this method, the software application program executed outside the secure environment maintains secret information, such as a password, serial number, cryptographic keys, or other information. Verification of the secret information takes place in the insecure environment. History has shown that verifications of information performed in an insecure environment are frequently bypassed by software or software patches employed by software pirates, thus the security provided by such a scheme is largely cosmetic.

OBJECTS AND ADVANTAGES

It is therefore an object of the invention to safeguard software applications themselves from infringing uses, instead of merely preventing copyright infringement or other misuse of content or data processed by said applications.

It is another object of the invention to enable software application vendors to enforce machine-specific operating restrictions.

It is another object of the invention to enable software application vendors to enforce user-specific operating restrictions.

It is another object of the invention to enable software application vendors to enforce group-specific operating restrictions.

It is another object of the invention to enable software application vendors to enforce time-limited application operating restrictions.

It is another object of the invention to provide the above benefits without encumbering legitimate users or the performance of the protected software application program.

Other objects and advantages of the present invention will become apparent from the following descriptions, taken in connection with the accompanying drawings, wherein, by way of illustration and example, an embodiment of the present invention is disclosed.

BRIEF SUMMARY OF THE INVENTION

In accordance with the present invention, there is disclosed a computerized method for protecting a software application against software piracy comprising the steps of choosing a component and executing said component inside a secure environment.

In accordance with the present invention, there is also disclosed a system for protecting software against piracy comprising: a processing unit, a system memory coupled to the processing unit through a system bus, a computer-readable medium coupled to the processing unit through the system bus, an operating system executed from the computer-readable medium, a secure environment, a software application, and a component which will execute in the secure environment.

In accordance with the present invention, there is finally disclosed a computerized method for using a compiler to protect a software application against software piracy.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DETAILED DESCRIPTION OF THE INVENTION

Figure 1:
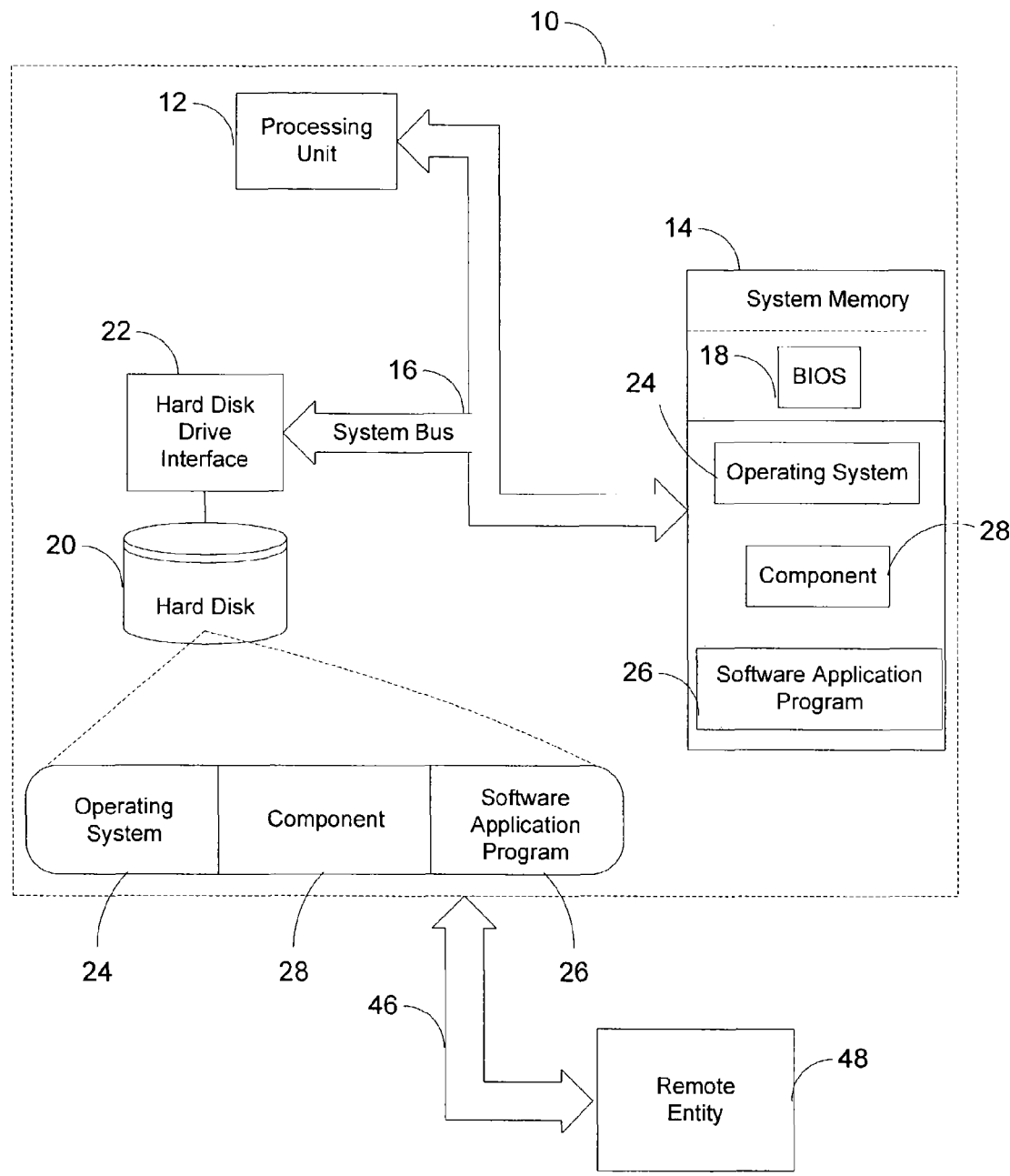
FIG. 1 is a diagram of the hardware and operating environment in conjunction with which exemplary embodiments of the invention may be practiced.

FIG. 1 is a diagram of the hardware and operating environment in conjunction with which embodiments of the invention may be practiced. The invention is described in the general context of computer-executable instructions, such as program modules, which generally include routines, programs, objects, components, data structures, etc., that implement particular abstract data types or perform particular tasks.

Those skilled in the art will appreciate that the invention may be practiced with other computer system configurations, including distributed computing environments, where program modules may be located in both local and remote memory storage areas; minicomputers; hand-held devices; multiprocessor systems; microprocessor-based or programmable consumer electronics; mainframe computers; and other configurations.

The exemplary hardware and operating environment for implementing the invention, depicted in FIG. 1, includes a general purpose computing platform 10, including a processing unit 12, a system memory 14, and a system bus 16 that operatively couples various system components, including the system memory 14 to the processing unit 12. There may be a single processing unit 12, such that the processor of the computing platform 10 comprises a single central processing unit 12 (CPU), or a plurality of processing units, commonly known as a parallel processing environment. The invention is not limited by the type of computing platform, which may include a conventional computer, a distributed computer, a mainframe computer, or any other type of computer.

The system bus 16 may be any of several types of bus structures including a memory bus or memory controller, a peripheral bus, and a local bus using any of a variety of bus architectures. The system memory 14 may be referred to as simply the memory and includes random access memory (RAM) and read only memory (ROM). A basic input/output system (BIOS) 18, containing basic routines which help to transfer information between elements within the computing platform 10 is stored in system memory 14. The computer also includes a hard disk drive 20 for reading from or writing to a hard disk, not shown. The hard disk drive 20 is connected to the system bus 16 by a hard disk drive interface 22. The hard disk drive 20 and its associated computer-readable media provide nonvolatile storage of computer-readable instructions, data structures, program modules, and other data for the computer. It should be appreciated by those skilled in the art that any type of computer-readable media that can store data that is accessible by a computer could be used in the exemplary operating environment, in addition to, or instead of the hard disk. Such media include magnetic disks, optical disks, magnetic cassettes, flash memory cards, digital video disks, USB storage devices, random access memories, and read only memories.

A number of program modules may be stored on the hard disk drive 20 or in system memory 14, including an operating system 24, one or more software application programs 26, components 28, and program data (not shown).

A display device, such as a monitor (not shown) may be connected to the system bus 16 via an interface, such as a video adapter (not shown). A person skilled in the art would recognize that any number of other output devices could also be connected to the computing platform 10.

A user can input information into the computing platform 10 through input devices such as a keyboard (not shown) and a mouse (not shown). These and other input devices (not shown) are normally connected to the processing unit 12 through a universal serial bus (USB) (not shown), but may also be connected via a serial, IEEE-1394 port, parallel port, game port, or other interfaces (not shown).

The computing platform 10 may use a communication device to operate in a network 46 by connecting to one or more remote entities, such as remote entity 48. Operation in a network 46 is not a requirement of the invention, and the invention is not limited to a particular type of communications device. The remote entity 48 may be a computer, a server, a router, a peer device, a client, or other common network node. The remote entity 48 typically includes many or all of the above elements described relative to the computing platform 10. Common network connections include a local-area network (LAN) (not depicted) and a wide-area network (WAN) (not depicted). If operating in a networked environment, program modules depicted relative to the computing platform 10, or portions thereof, may be stored in a storage device located on the remote entity 48. Alternatively, applications on remote servers may depend on components executed on the local computer.

Figure 2:
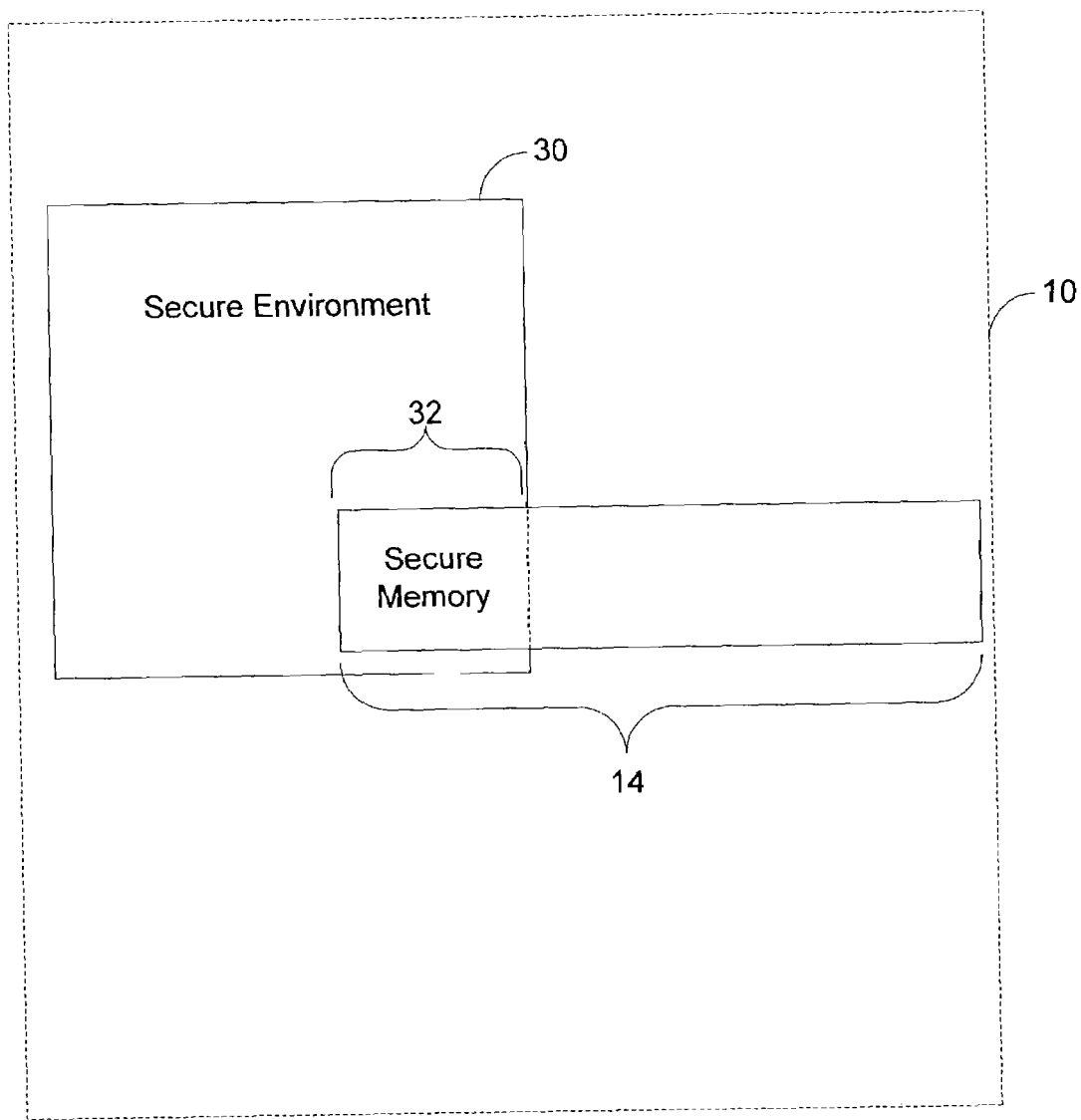
FIG. 2 is a diagram of a client computer for use with exemplary embodiments of the invention.

FIG. 2 depicts a system level overview of the operation of an exemplary embodiment of the invention. The computing platform 10 includes a secure environment 30, which may be provided by operating systems built on top of TCPA specifications, the DRMOS as described in U.S. Pat. No. 6,330,670, or by some other means. The secure environment 30 provides an operating environment in which access to all or parts of the operating memory is controlled by the secure environment 30, making this section of memory inaccessible to the user or hostile or unauthorized applications. Such memory is secure memory 32. The secure environment 30 offers an operating environment in which the execution of software instructions permitted to access the secure memory 32 can be limited to signed and authenticated instructions.

Figure 3:
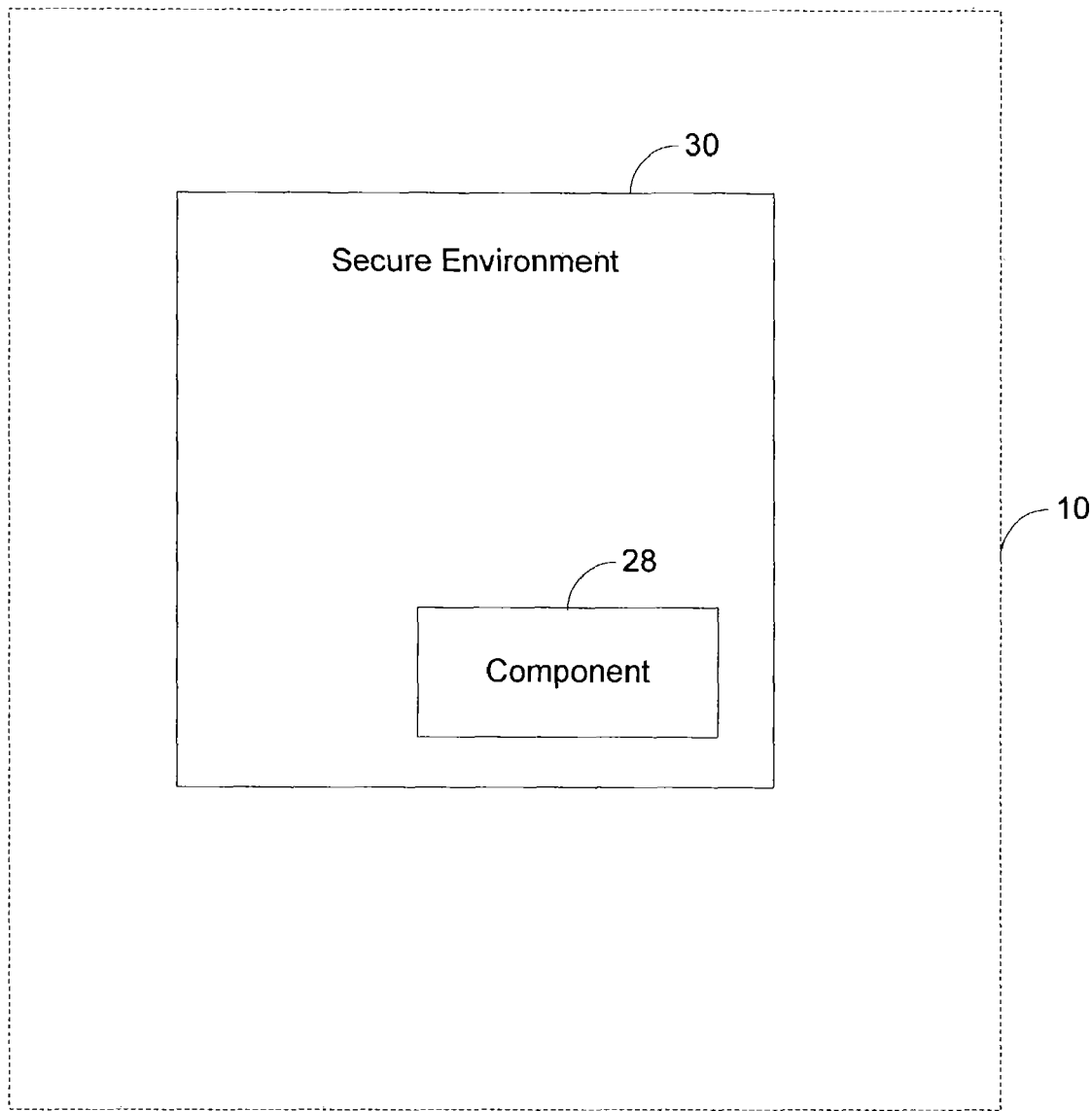
FIG. 3 is a diagram of how the anti-piracy protection is implemented in the secure environment.

FIG. 3 is a depiction of the method of exemplary embodiment of the invention. A software application program 26 can be protected against piracy by modifying or writing the software application program 26 in such a way that a component 28 is executed inside the secure environment 30. The required modifications could be performed manually by the software author or automated by a software compiler. While the software application program 26 could be executed entirely in the secure environment 30, secure environments often offer less speed, memory, application programming interfaces (APIs) or other functionality than an associated insecure environment. It is thus desirable to only execute part of an application, or a component 28, inside the secure environment 30. Frequently, such component 28 will take the form of a shared library or Dynamic Link Library (DLL). A person skilled in the art will also realize that plug-ins and any number of other code segments could also be used as a component 28. To maximize protection against software piracy, the component 28 should perform a required or desirable part of the functionality of the application as a whole that is not easily emulated in patches as may be employed by software pirates. Core application functionality that is instrumental to the application, or complex functionality that is difficult to re-create, individually, or used together, make good candidates for functionality components 28 that can be executed inside the secure environment 30. Persons skilled in the art will readily recognize that other examples of such functionality components 28 include a character display engine; graphics renderer; document formatting engine; spreadsheet formula engine; mathematical operations; formulas used by the application; application components that read, save, or transform documents; and spell checkers and other correction engines.

One or more metrics 34 are designated to be measured to assert the identity of a computing platform 10, computer user, computing platform group, or group of computing platform users. Such metrics 34 could be unique to a particular secure environment 30, or shared by a group of secure environments, including, but not limited to any combination of cryptographic keys, processor serial numbers, hardware identifiers, hard drive serial numbers, Ethernet NIC MAC addresses, etc. The metrics 34 employed in this invention could also include parameters such as computing platform localization settings such as location, language, date, and time format; and software licensing conditions, such as the present date and time for applications that are licensed under a time-limited license, or the country for which the application was licensed. A person skilled in the art would readily understand metrics 34 to include anything which can be measured and ascertained.

The component 28 executed inside the secure environment 30 determines whether the metrics 34 verify. The metrics 34 may also be verified by another component located inside or outside the secure environment 30, locally or remotely.

Based on the result of the metric verification (including a match, mismatch, or partial match), the software application program 26 or component 28 may operate not at all, in reduced functionality mode, communicate the result to the software application program 26, report the result to a reportee 44, or some combination of those actions. A person skilled in the art would recognize that a reportee 44 could include a local entity, such as the computing platform 10 or some portion of the computing platform 10, or a remote entity 48.

Analogously to the above, based on the result of the metric verification, a software application program 26 or component 28 executed outside the secure environment 30 may operate not at all, in reduced functionality mode, communicate the result to the software application program 26, report the result to a reportee 44, or some combination of those actions.

Analogously to the above, if a required component 28 is missing, damaged, or has otherwise been altered, or if a prohibited software component 50 is present on the computing platform 10 (either stored in media, or loaded in memory) the software application program 26 may operate not at all, in reduced functionality mode, communicate the result to the software application program 26, report the result to a reportee 44, or some combination of those actions.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method for protecting a software application comprising:
   choosing a component;
   executing said component inside a secure environment;
   choosing one or more local metrics;
   verifying the one or more metrics and determining a result; and
   operating not at all, operating in reduced functionality mode, or reporting the result to a reportee, based on the verification result.

2. A method for protecting a software application comprising:
   choosing a component;
   executing said component inside a secure environment;
   checking if a required software component is missing, damaged, or has otherwise been altered; and
   operating not at all, operating in reduced functionality mode, or reporting the state of said altered component.

3. A method for protecting a software application comprising:

choosing a component;
executing said component inside a secure environment;
checking for a prohibited software component; and
operating not at all, operating in reduced functionality mode, or reporting the existence of said prohibited component.

4. A system for protecting software against piracy comprising:
a processing unit;
a system memory coupled to the processing unit though a system bus;
a computer-readable medium coupled to the processing unit through a system bus;
an operating system executed from the computer-readable medium;
a secure environment;
a software application; and
a component which will execute in the secure environment.

5. The system claimed in claim 4 further comprising one or more metrics.

6. The system claimed in claim 5 further comprising means for verifying said metrics.

7. The system claimed in claim 6 further comprising communication means for reporting said metrics.

8. The system claimed in claim 7 further comprising means for operating not at all or operating in reduced functionality mode.

9. The system claimed in claim 6 further comprising means for operating not at all or operating in reduced functionality mode.

* * * * *